July 28, 1959  F. ROMSTEADT, JR  2,896,440
HUB CAP LOCK
Filed Nov. 12, 1957
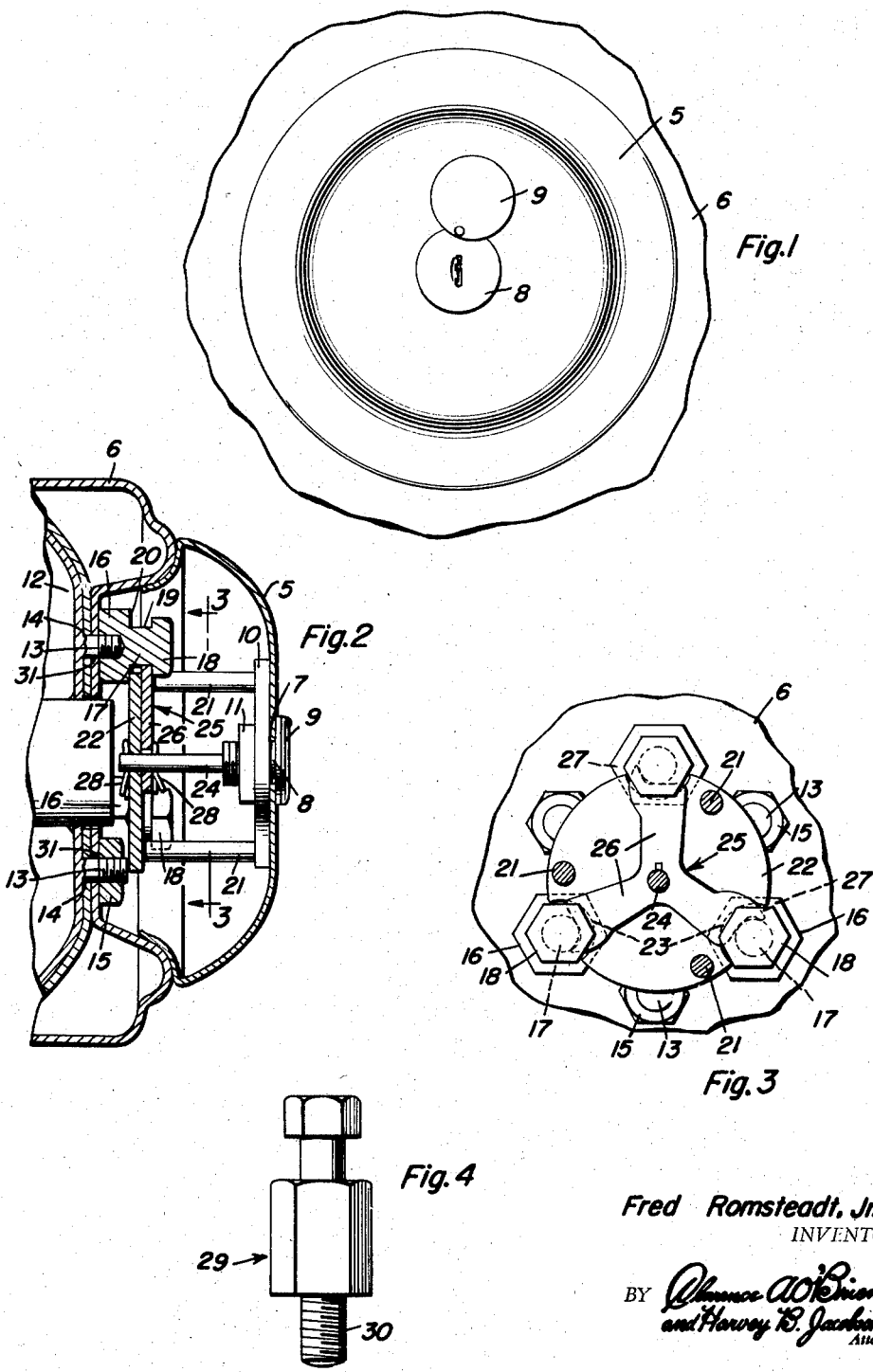
Fred Romsteadt, Jr.
INVENTOR.

United States Patent Office 2,896,440
Patented July 28, 1959

2,896,440

HUB CAP LOCK

Fred Romsteadt, Jr., Philadelphia, Pa., assignor of fifty percent to Carl Collin Whisler, Brooklawn, N.J.

Application November 12, 1957, Serial No. 695,765

2 Claims. (Cl. 70—258)

The present invention relates to new and useful improvements in hub cap locks particularly for motor vehicles and has for its primary object to provide, in a manner as hereinafter set forth, novel means for positively preventing the theft of such caps and the wheels on which they are mounted.

Another very important object of the invention is to provide a lock of the character described which may be readily applied to conventional hub caps without the necessity of making material structural alterations therein.

Still another important object of the present invention is to provide a hub cap lock of the aforementioned character which also functions as a means for securing the wheel on the hub.

Other objects of the invention are to provide a hub cap lock of the character set forth which will be comparatively simple in construction, strong, durable, compact and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation of a hub cap provided with a lock embodying the present invention;

Figure 2 is a vertical sectional view through the hub cap, lock and the adjacent portion of the wheel;

Figure 3 is a vertical sectional view, taken substantially on the line 3—3 of Figure 2; and Figure 4 is a detail view in elevation, showing a slight modification.

Referring now to the drawing in detail, it will be seen that reference character 5 designates a hub cap which is mounted in the usual manner on a vehicle wheel 6. The hub cap 5 has formed therein a centrally located circular opening 7. Aside from the opening 7, the hub cap 5 is conventional.

Mounted on the hub cap 5 in the opening 7 is a key-operated lock 8. The lock 8 includes a cover 9. Mounted on the lock 8 in face-abutting engagement with the inner side of the side cap 5 is a disk 10 of suitable metal. A nut 11 is threaded on the inner end portion of the lock 8 for securing said lock and disk 10 in position on the hub cap 5.

The wheel 6 is secured on the hub 12 by means comprising the usual studs 13 engaged in openings 14 provided therefor in said wheel. Reference character 15 designates the usual nuts on the studs 13. Certain of the nuts 15 are removed and nuts 16 substituted therefor. The nuts 16 comprise longitudinal necks 17 on their outer ends, said necks terminating in heads 18. The members 16, 17 and 18 define circumferential grooves 19 and shoulders 20.

Fixed on the disk 10 is a plurality of inwardly projecting rods 21. Fixed on the inner end portions of the rods 21 is a substantially circular guide and stop plate or disk 22 which is adapted to abut the shoulders 20 of the nuts 16. Toward this end, the peripheral portion of the plate 22 is provided with arcuate recesses or cut-outs 23 which permit said plate to clear the heads 18 when the hub cap 5 is applied to the wheel 6.

Operatively connected to the lock 8 is a shaft 24 having its inner end portion journalled in an opening provided therefor in the plate 22. Fixed on the shaft 24 in abutting engagement with the plate 22 is a multiple swinging bolt 25. The bolt 25 includes a plurality of flat, radial arms 26 the outer or free ends of which are engageable in the grooves 19 behind the heads 18 of the nuts 16. Stops 27 on the free ends of the arms 26 are engageable with the necks 17 of the nuts 16 for arresting said arms when they enter the grooves 19.

It is thought that the operation of the device will be readily apparent from a consideration of the foregoing. Briefly, certain of the usual nuts 15 are removed from the studs 13 and the nuts 16 substituted therefor. With the arms 26 in retracted or inoperative position, the hub cap 5 is inserted in the vehicle wheel 6 in the usual manner. To accomplish this, the recesses 23 must be aligned with the heads 18 to permit the plate 22 to pass. When the hub cap 5 is thus mounted the plate 22 abuts the shoulders 20 of the nuts 16. A key is then inserted in the lock 8 and turned for rotating the shaft 24. In this manner the arms 26 are swung into the grooves 19 behind the heads 18 for locking the cap 5 to the nuts 16, after which the key is withdrawn from the lock 8. Of course, to remove the hub cap 5 the foregoing procedure is substantially reversed. Cotter pins 28 are provided on the shaft 24 on opposite sides of the members 22 and 25.

In Figure 4 of the drawing, reference character 29 designates a stud bolt to be used on wheel hubs which do not include the stud bolts 13. Toward this end, the bolts 29 comprise the threaded shanks 30 to be inserted through the openings 31 in the wheel 6 and screwed into the usual openings provided therefor in the hub. The bolts 29 are otherwise substantially similar structurally to the nuts 16 for receiving the members 22 and 25.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lock for securing a hub cap to a vehicle wheel mounted on a hub, said lock comprising: threaded members securing the wheel to the hub, said members including heads on one end and shoulders spaced inwardly from said heads, a key operated lock mounted on the cap, a disc mounted on said lock in the cap, a plurality of rods fixed on said disc, a plate fixed on the rods and engageable with the shoulders, a rotary shaft journalled in said plate and operatively connected to the lock for actuation thereby, and a plurality of arms fixed rigidly on the shaft and rotatable thereby into engagement with said members behind the heads for anchoring the cap to said members.

2. Means for securing a hub cap on a wheel removably mounted on a hub, said means comprising: retaining bolts for the wheel threadedly mounted in the hub, said bolts including heads on one end and shoulders spaced inwardly from said heads, a lock mounted on the cap, a disc mounted on said lock in the cap, rods fixed on said discs, a plate fixed on said rods and adapted for abutting engagement with the shoulders, a rotary shaft journalled in the plate and operatively connected to the lock, and radiating arms fixed rigidly on the shaft and rotatable thereby into engagement with said bolts behind the heads for anchoring the cap to said bolts, said plate being notched for lateral movement past said heads into engagement with said shoulders.

References Cited in the file of this patent

UNITED STATES PATENTS

| | | |
|---|---|---|
| 2,124,035 | Hurd | July 19, 1938 |
| 2,807,157 | McLin | Sept. 24, 1957 |